United States Patent
Lewis

(10) Patent No.: US 9,850,171 B2
(45) Date of Patent: Dec. 26, 2017

(54) CERAMIC PRECURSOR BATCH COMPOSITIONS FOR INCREASED STIFFENING ONSET TEMPERATURE USING ORGANIC ADDITIVE HETEROATOM POLYOLS

(71) Applicant: CORNING INCORPORATED, Corning, NY (US)

(72) Inventor: Mark Alan Lewis, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 197 days.

(21) Appl. No.: 14/961,351

(22) Filed: Dec. 7, 2015

(65) Prior Publication Data

US 2016/0083299 A1 Mar. 24, 2016

Related U.S. Application Data

(62) Division of application No. 13/836,338, filed on Mar. 15, 2013, now Pat. No. 9,233,880.

(60) Provisional application No. 61/720,194, filed on Oct. 30, 2012.

(51) Int. Cl.

| | |
|---|---|
| *C04B 38/00* | (2006.01) |
| *C04B 38/06* | (2006.01) |
| *C04B 35/63* | (2006.01) |
| *C04B 26/28* | (2006.01) |
| *C04B 35/478* | (2006.01) |
| *C04B 35/195* | (2006.01) |
| *C04B 35/632* | (2006.01) |
| *C04B 35/636* | (2006.01) |
| *C04B 111/00* | (2006.01) |

(52) U.S. Cl.
CPC .......... *C04B 35/478* (2013.01); *C04B 26/285* (2013.01); *C04B 35/195* (2013.01); *C04B 35/632* (2013.01); *C04B 35/6365* (2013.01); *C04B 38/0006* (2013.01); *C04B 38/068* (2013.01); *C04B 38/0645* (2013.01); *C04B 2111/00129* (2013.01); *C04B 2111/00793* (2013.01); *C04B 2235/6021* (2013.01)

(58) Field of Classification Search
None
See application file for complete search history.

(56) References Cited

U.S. PATENT DOCUMENTS

| | | | |
|---|---|---|---|
| 6,030,571 A | 2/2000 | Nakane et al. | |
| 6,200,517 B1 | 3/2001 | Peng et al. | |
| 6,287,510 B1 | 9/2001 | Xun | |
| 6,942,713 B2 | 9/2005 | Ogunwumi et al. | |
| 7,001,861 B2 | 2/2006 | Beall et al. | |
| 9,233,880 B2* | 1/2016 | Lewis ................... C04B 35/632 |
| 2002/0071709 A1 | 6/2002 | Miyamoto | |
| 2007/0261378 A1 | 11/2007 | Miao et al. | |
| 2010/0029462 A1 | 2/2010 | DeRosa et al. | |
| 2010/0117272 A1 | 5/2010 | DeRosa | |
| 2013/0133550 A1 | 5/2013 | DeRosa | |

FOREIGN PATENT DOCUMENTS

| | | |
|---|---|---|
| EP | 2247554 B1 | 1/2012 |
| JP | 2004203705 A | 7/2004 |
| JP | 2008239421 A | 10/2008 |
| JP | 2009046385 A | 3/2009 |
| JP | 2012206259 A | 10/2012 |
| WO | 2004011386 A1 | 2/2004 |

OTHER PUBLICATIONS

The International Search Report and Written Opinion, dated Jan. 16, 2014, International Application No. PCT/US2013/066280, International Filing Date Oct. 23, 2013.
Chinese First Office Action App 201380056900.1 dated Jun. 6, 2016.
English Translation of JP2015539733 Office Action dated Mar. 28, 2017, Japan Patent Office.

* cited by examiner

*Primary Examiner* — David M Brunsman

(57) ABSTRACT

A ceramic precursor batch composition comprising inorganic ceramic-forming ingredients, a binder, an aqueous solvent and a heteroatom polyol agent. The heteroatom polyol agent can be represented by X(R) where X is at least one of S, N, and P, and R is at least two of $CH_3$, $CH_2CH_2OH$, $CH_2CH_2CH_2OH$, $CH_2(CHOH)CH_3$, $C(CH_2OH)_{1-3}$, $CH_2OH$, $CH(CH_2OH)CHOH$, $C(O)(CHOH)_{1-4}CH_2OH$, and $CH_2CH_2CH_2OCH_3$. The presence of the heteroatom polyol agent provides a composition with a lower viscosity and/or a greater batch stiffening temperature ($T_{onset}$) allowing for increased rates of extrusion. Methods for producing a ceramic honeycomb body using this ceramic precursor batch composition are also provided.

10 Claims, 3 Drawing Sheets

CERAMIC PRECURSOR BATCH COMPOSITIONS FOR INCREASED STIFFENING ONSET TEMPERATURE USING ORGANIC ADDITIVE HETEROATOM POLYOLS

This application is a divisional of and claims the benefit of priority to U.S. patent application Ser. No. 13/836,338 filed on Mar. 15, 2013, now U.S. Pat. No. 9,233,880, which claims the benefit of U.S. Provisional Patent Application No. 61/720,194, filed on Oct. 30, 2012, the content of both of which are relied upon and hereby incorporated by reference for all purposes as if fully set forth herein.

BACKGROUND

The present disclosure relates generally to ceramic precursor batch compositions, and particularly to ceramic precursor batch compositions and batches comprising heteroatom polyol agents for forming ceramic honeycombs.

In the formation of ceramic bodies, e.g., silicon carbide, cordierite, mullite, alumina, or aluminum titanate bodies, plasticized mixtures of various inorganic powder batches are prepared which are then formed into various shapes. These plasticized mixtures should be well blended and homogeneous in order for the resulting shaped body to have relatively good integrity in both size and shape, and uniform physical properties. These mixtures typically further include organic additives such as binders, plasticizers, surfactants, lubricants, and dispersants as processing aids to enhance cohesion, plasticity, lubricity, and/or wetting, and therefore to produce a more uniform batch.

Cellulose ethers have been used as extrusion binders to impart plasticity while imparting good drying behavior. While other ceramic binder systems can also be used for ceramic extrusion, cellulose ethers such as methylcellulose (MC), hydroxypropylcellulose (HPMC) and hydroxyethylmethylcellulose (HEMC) can form high temperature gels. The gelling behavior facilitates rapid drying while preventing distortions as they are heated.

In order to form the batches described above into various shapes, the batch materials are usually fed through an extruder. The rate at which the batch materials can be fed through the extruder is limited in part by the $T_{onset}$ of the batch. $T_{onset}$ refers to the temperature at which the rheology of the batch begins to transition from low to high viscosity. Higher $T_{onset}$ can enable greater batch feed rate and higher batch feed rate can result in reduced processing costs.

The above information disclosed in this Background section is only for enhancement of understanding of the background of the invention and therefore it may contain information that does not form any part of the prior art nor what the prior art may suggest to a person of ordinary skill in the art.

SUMMARY

An exemplary embodiment of the disclosure relates to a method of producing a ceramic honeycomb body. The method includes compounding inorganic ceramic-forming ingredients, adding a cellulose-based binder, an aqueous-based solvent, and a heteroatom polyol to the inorganic ceramic-forming ingredients, wherein the heteroatom polyol is optionally pre-mixed with the aqueous-based solvent, mixing the inorganic ceramic-forming ingredients, the binder, the solvent, and the heteroatom polyol agent to form a precursor batch, forming the precursor batch into a green honeycomb body and firing the green honeycomb body to produce the ceramic honeycomb body. The heteroatom polyol is represented by X(R) where X is at least one of S, N, and P, and R is at least two of $CH_3$, $CH_2CH_2OH$, $CH_2CH_2CH_2OH$, $CH_2(CHOH)CH_3$, $C(CH_2OH)_{1-3}$, $CH_2OH$, $CH(CH_2OH)CHOH$, $C(O)(CHOH)_{1-4}CH_2OH$, and $CH_2CH_2CH_2OCH_3$.

Another exemplary embodiment of the disclosure relates to a method of producing a ceramic precursor batch. The method includes compounding inorganic ceramic-forming ingredients and adding a cellulose-based binder, an aqueous-based solvent, and a heteroatom polyol to the inorganic ceramic-forming ingredients to form the ceramic precursor batch, wherein the heteroatom polyol is optionally mixed with the aqueous-based solvent prior to adding to the inorganic ceramic-forming ingredients. The heteroatom polyol agent is represented by X(R) where X is at least one of S, N, and P, and R is at least two of $CH_3$, $CH_2CH_2OH$, $CH_2CH_2CH_2OH$, $CH_2(CHOH)CH_3$, $C(CH_2OH)_{1-3}$, $CH_2OH$, $CH(CH_2OH)CHOH$, $C(O)(CHOH)_{1-4}CH_2OH$, and $CH_2CH_2CH_2OCH_3$.

Another exemplary embodiment of the disclosure relates to a ceramic precursor batch composition. The ceramic precursor batch composition includes inorganic ceramic-forming ingredients, a cellulose-based binder, an aqueous-based solvent and a heteroatom polyol, wherein the heteroatom polyol agent is represented by X(R) where X is at least one of S, N, and P, and R is at least two of $CH_3$, $CH_2CH_2OH$, $CH_2CH_2CH_2OH$, $CH_2(CHOH)CH_3$, $C(CH_2OH)_{1-3}$, $CH_2OH$, $CH(CH_2OH)CHOH$, $C(O)(CHOH)_{1-4}CH_2OH$, and $CH_2CH_2CH_2OCH_3$.

Additional features and advantages of the invention as claimed will be set forth in the detailed description which follows, and in part will be readily apparent to those skilled in the art from that description or recognized by practicing the invention as claimed herein, including the detailed description which follows, the claims, as well as the appended drawings.

It is to be understood that both the foregoing general description and the following detailed description present exemplary embodiments of the claimed invention, and are intended to provide an overview or framework for understanding the nature and character of the invention as it is claimed. The accompanying drawings are included to provide a further understanding of the invention as claimed, and are incorporated into and constitute a part of this specification. The drawings illustrate various embodiments of the invention as claimed, and together with the description serve to explain the principles and operations of the invention as claimed.

BRIEF DESCRIPTION OF THE DRAWINGS

The accompanying drawings illustrate certain exemplary embodiments of the disclosure.

DETAILED DESCRIPTION

Figure 1:
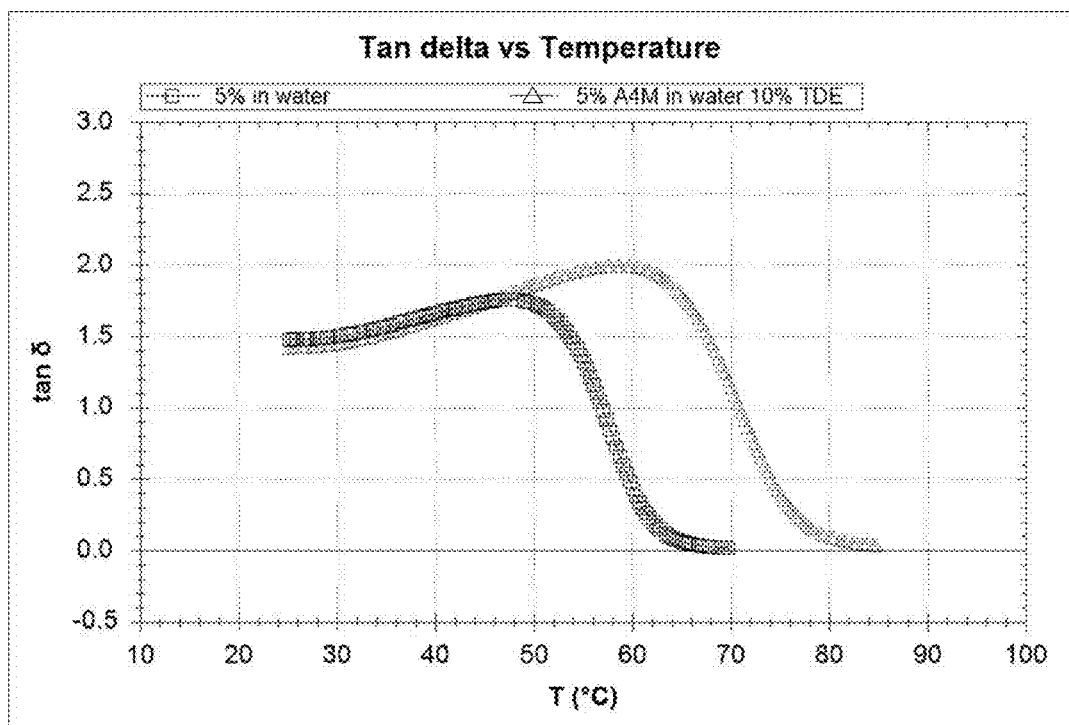
FIG. 1 is a graphical representation of the impact of thiodiethanol ($HOCH_2CH_2SCH_2CH_2OH$, 2,2'-thiodiethanol) ("TDE") on the gel temperature of an example METHOCEL. The gel temperature (point where tangent of δ value crosses 1) of the TDE modified system is 71° C. or about a 14° C. shift higher in temperature than the control example.

Various exemplary embodiments of the disclosure will be described in detail with reference to the drawings. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of W, Y, and Z" can be construed as W only, Y only, Z only, or any combination of two or more items W, Y, and Z (e.g., WYZ, WYY, YZ, ZZ).

Compositions disclosed herein can, in exemplary embodiments, have a higher $T_{onset}$. For example, ceramic precursor batch compositions can have a $T_{onset}$ of at least 1° C. higher, such as at least 3° C. higher, and further such as at least 5° C. higher, and yet further such as at least 8° C. higher, and still yet further such as at least 10° C. higher, including from 1° C. to 10° C. higher, than an otherwise identical or substantially similar batch composition that does not comprise the heteroatom polyol.

Compositions disclosed herein comprise inorganic-ceramic forming ingredients as well as organic ingredients or additives, wherein the organic ingredients or additives include at least one heteroatom polyol.

The inorganic ceramic-forming ingredients may be synthetically produced materials such as oxides, hydroxides, etc., or they may be naturally occurring minerals such as clays, talcs, or any combination of these. Embodiments disclosed herein are not limited to the types of powders or raw materials. These may be chosen depending on the properties desired in the ceramic body.

In one set of exemplary embodiments, the inorganic ceramic-forming ingredients may yield an aluminum-titanate ceramic material upon firing. In other exemplary embodiments, the inorganic ceramic-forming ingredients may be those that yield cordierite, mullite, or mixtures of these on firing, some examples of such mixtures being about 2% to about 60% mullite, and about 30% to about 97% cordierite, with allowance for other phases, typically up to about 10% by weight.

One composition, by way of a non-limiting example, which ultimately forms cordierite upon firing is as follows in percent by weight: about 33-41, such as about 34-40 of aluminum oxide, about 46-53 such as about 48-52 of silica, and about 11-17 such as about 12-16 magnesium oxide.

According to exemplary embodiments a ceramic precursor batch composition is provided with a higher stiffening onset temperature ($T_{onset}$), allowing for greater extrusion feedrates without significant increases in pressure. The composition can comprise inorganic ceramic-forming ingredients, a cellulose-based binder, an aqueous solvent such as, but not limited to, water or water-miscible solvents. The water-miscible solvent can be a heteroatom polyol represented by X(R) where X is at least one of S, N, and P, and R is at least two of $CH_3$, $CH_2CH_2OH$, $CH_2CH_2CH_2OH$, $CH_2(CHOH)CH_3$, $C(CH_2OH)_{1-3}$, $CH_2OH$, $CH(CH_2OH)CHOH$, $C(O)(CHOH)_{1-4}CH_2OH$, and $CH_2CH_2CH_2OCH_3$.

This heteroatom polyol can include, for example, thiodiethanol ($HOCH_2CH_2SCH_2CH_2OH$, 2,2'-thiodiethanol) ("TDE"), represented by formula [1] alone or in combination with other heteroatom polyols.

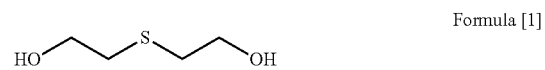

Formula [1]

The heteroatom polyol can include, for example, 2-[(2-methoxyethyl)sulfanyl]ethanol, represented by formula [12] alone or in combination with other heteroatom polyols.

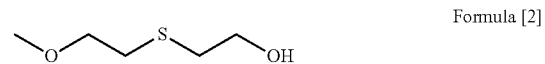

Formula [2]

The heteroatom polyol can include, for example, 3,3'-thiodipropanol ("TDP"), represented by formula [3] alone or in combination with other heteroatom polyols.

$HOCH_2CH_2CH_2SCH_2CH_2CH_2OH$      Formula [3]

The heteroatom polyol can include, for example, tris-(2-hydroxyethyl)-sulfonium chloride, represented by formula [4] alone or in combination with other heteroatom polyols.

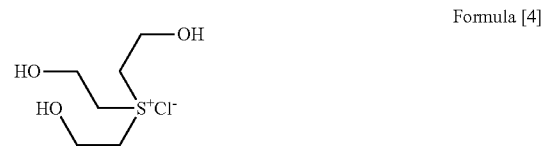

Formula [4]

The heteroatom polyol can include, for example, 2,2'-sulfinyldiethanol, represented by formula [5] alone or in combination with other heteroatom polyols.

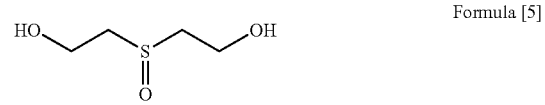

Formula [5]

The heteroatom polyol can include, for example, 2,3,4,5,6-pentahydroxy-N-(2-hydroxyethyl)hexanamide, represented by formula [6] alone or in combination with other heteroatom polyols.

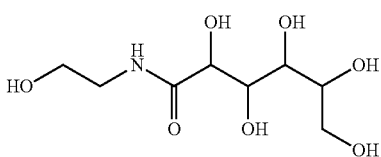

Formula [6]

The heteroatom polyol can include, for example, 1,4-Dideoxy-1,4-imino-D-arabinitol hydrochloride, represented by formula [7] alone or in combination with other heteroatom polyols.

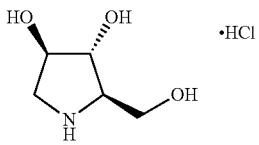

Formula [7]

The heteroatom polyol can include, for example, deoxyfuconojirimycin hydrochloride, represented by formula [8] alone or in combination with other heteroatom polyols.

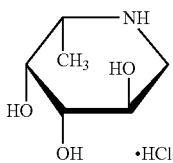

Formula [8]

The heteroatom polyol can include, for example, triethanolamine, represented by formula [9] alone or in combination with other heteroatom polyols.

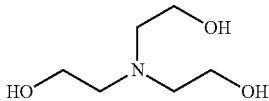

Formula [9]

The heteroatom polyol can include, for example, 2-hydroxy-N,N,N-tris(2-hydroxyethyl)ethanaminium hydroxide, represented by formula [10] alone or in combination with other heteroatom polyols.

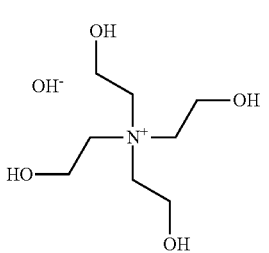

Formula [10]

The heteroatom polyol can include, for example, 1-[N,N-bis(2-hydroxyethyl)amino]-2-propanol, represented by formula [11] alone or in combination with other heteroatom polyols.

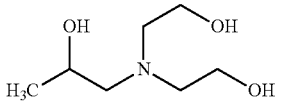

Formula [11]

The heteroatom polyol can include, for example, 2-[bis(2-hydroxyethyl)amino]-2-(hydroxymethyl)-1,3-propanediol, represented by formula [12] alone or in combination with other heteroatom polyols.

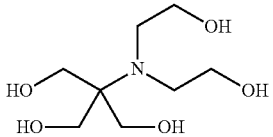

Formula [12]

The heteroatom polyol can include, for example, tetrakis(hydroxymethyl)phosphonium chloride solution, represented by formula [13] alone or in combination with other heteroatom polyols.

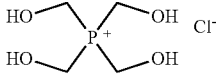

Formula [13]

The heteroatom polyol can include, for example, bis[tetrakis(hydroxymethyl)phosphonium]sulfate solution, represented by formula [14] alone or in combination with other heteroatom polyols.

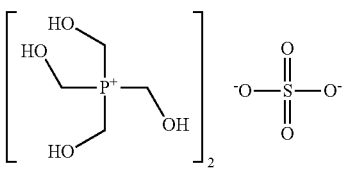

Formula [14]

The heteroatom polyol can also include, for example, combinations of the heteroatom polyols represented by formulas [1]-[14]. There is also provided a method of producing a ceramic honeycomb body using this ceramic precursor batch composition.

The ceramic precursor batch composition disclosed herein comprises at least one heteroatom polyol to provide a batch composition that has a higher stiffening onset temperature ($T_{onset}$), a lower pressure during extrusion and a greater feedrate than the ceramic precursor batch compositions of the prior art that do not comprise a heteroatom polyol. The heteroatom polyol can be thiodiethanol ("TDE"), 2-[(2-methoxyethyl)sulfanyl]ethanol, 3,3'-thiodipropanol ("TDP"), tris-(2-hydroxyethyl)-sulfonium chloride, 2,2'-sulfinyldiethanol, 2,3,4,5,6-pentahydroxy-N-(2-hydroxyethyl)hexanamide, 1,4-Dideoxy-1,4-imino-D-arabinitol hydrochloride, deoxyfuconojirimycin hydrochloride, triethanolamine, 2-hydroxy-N,N,N-tris(2-hydroxyethyl)ethanaminium hydroxide, 1-[N,N-bis(2-hydroxyethyl)amino]-2-propanol, 2-[bis(2-hydroxyethyl)

amino]-2-(hydroxymethyl)-1,3-propanediol, tetrakis (hydroxymethyl)phosphonium chloride solution, bis [tetrakis(hydroxymethyl)phosphonium]sulfate solution, or combinations thereof. While not wishing to be bound by theory, the heteroatom polyol may increase the gelation temperature of the binder through hydrogen bonding interactions. The heteroatom polyol may attach to various sites on the binder by hydrogen bonding and inhibit intermolecular hydrogen bonding between individual binder molecules. Alternatively, heteroatom polyol may inhibit hydrophobic interactions between binder molecules. heteroatom polyol may solvate hydrophobic residues along the binder molecule by replacing water molecules in the hydration layer of the binder. Regardless of which mechanism is correct, the outcome of the theories is that a heteroatom polyol agent helps to disperse the binder molecules in aqueous solution and prevents them from aggregating, which leads to either gelling or phase separation at higher than normal temperatures.

In exemplary embodiments, the heteroatom polyol agent can be thiodiethanol ("TDE"), 2-[(2-methoxyethyl)sulfanyl] ethanol, 3,3'-thiodipropanol ("TDP"), tris-(2-hydroxyethyl)-sulfonium chloride, 2,2'-sulfinyldiethanol, 2,3,4,5,6-pentahydroxy-N-(2-hydroxyethyl)hexanamide, 1,4-Dideoxy-1,4-imino-D-arabinitolhydrochloride, deoxyfuconojirimycin hydrochloride, triethanolamine, 2-hydroxy-N,N,N-tris(2-hydroxyethyl)ethanaminium hydroxide, 1-[N,N-bis(2-hydroxyethyl)amino]-2-propanol, 2-[bis(2-hydroxyethyl)amino]-2-(hydroxymethyl)-1,3-propanediol, tetrakis (hydroxymethyl)phosphonium chloride solution, bis [tetrakis(hydroxymethyl)phosphonium]sulfate solution, or combinations thereof. The heteroatom polyol agent can be added to the batch composition in a concentration of from about 2.5 wt % to about 20 wt %. In an exemplary embodiment, the heteroatom polyol agent can be added to the batch composition in a concentration of from about 8 wt % to about 12 wt %. The concentration of the heteroatom polyol agent is the mass of heteroatom polyol agent to total mass of aqueous solvent. The amount of heteroatom polyol agent in the ceramic precursor batch composition may depend on the composition itself, the method of forming a green body and/or the desired batch stiffening temperature.

The cellulose-based binder can be, but not limited to, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxymethylcellulose, and combinations thereof. Methylcellulose and/or methylcellulose derivatives can be especially suited as organic binders particularly methylcellulose, hydroxypropyl methylcellulose, or combinations of these. Sources of cellulose ethers include METHOCEL A4M, F4M and F240 cellulose products from DOW CHEMICAL CO. METHOCEL A4M cellulose is a methylcellulose while METHOCEL F4M, and F240 cellulose products are hydroxypropyl methylcellulose.

The properties of suitable cellulose-based binders such as methylcellulose can include water retention, water solubility, surface activity or wetting ability, thickening of the mixture, providing wet and dry green strength to the green bodies, thermal gelation and hydrophobic association in an aqueous environment. In some embodiments, the cellulose ether binders promote hydrogen bonding interaction with the solvent. Non-limiting examples of substituent groups that maximize the hydrogen bonding interaction with polar solvents e.g. water, may be hydroxypropyl and hydroxyethyl groups, and to a smaller extent hydroxybutyl groups. The hydrophobically modified cellulose ether binder can make up in some embodiments, as a superaddition, about 1-10% by weight, and in other embodiments about 2-6% by weight of the inorganic ceramic-forming material.

The solvent can provide a medium for the binder to dissolve in, thus providing plasticity to the ceramic precursor batch and wetting of the powders. The solvent can be aqueous based such as, but not limited to, water or water-miscible solvents. Aqueous based solvents can provide hydration of the binder and powder particles. In some embodiments, the amount of aqueous solvent is from about 10% by weight to about 50% by weight. The heteroatom polyol agent reduces the viscosity of the ceramic precursor batch. Therefore it may be desirable to reduce the amount of aqueous solvent by, for example, about 1-23% by weight to give a ceramic precursor batch having the same viscosity or stiffness as compositions without the heteroatom polyol agent but having a higher batch stiffening temperature. The lower amount of aqueous solvent may allow for faster drying of a green body formed from the ceramic precursor batch.

The heteroatom polyol agent imparts control of $T_{onset}$ through solubilization of the binder material reducing the entropically driven gelation event, thus imparting favorable rheology in extruding green structures including increased stiffness and lubrication without added extrusion pressure and with lower amounts of aqueous solvent. The heteroatom polyol is multifunctional. The heteroatom polyol may also be an oxidation-retarding agent (also referred to as antioxidant) in forming mixtures.

In general, organic materials have to be removed from the shaped green structure during the firing cycle. This generally results in cracking of the body possibly due to pressure build up inside the structure and/or differential temperature produced by combustion of the organics in the early stages of firing. The heteroatom polyol agent acts to remove organic compounds from green structures by delaying oxidation or combustion of the organics during the firing cycle of the structure, by including oxidation-retarding or antioxidant properties in the forming mixtures. As a result of delaying oxidation during temperature rise in the furnace, significantly more organics in the green structure leave the body via vaporization or thermal decomposition. This results in a net reduction of the exothermic heat caused by oxidation in the firing cycle, because vaporization is an endothermic processes. Smaller differential temperatures within the part are thus possible with reduced exothermic reactions and therefore, chances of cracking induced by differential temperature are significantly reduced or eliminated.

Several additional benefits are realized by the heteroatom polyol agent in the forming mixture, such as increased green structure strength and stiffness, and reduced amounts of liquids, e.g. non-solvent, and solvent phases as would be required otherwise to achieve the desired stiffness for the green body. In short, exemplary embodiments of the disclosure relate to using the heteroatom polyol agent as an antioxidant to achieve a smooth crack-free firing with the added benefits to the forming of green bodies, for example higher green strength and stiffness, less non-solvent and solvent for relatively same stiff batches. The method may be important for firing of extruded thin wall honeycombs (e.g., for those having approximate geometries of 62 cells/cm$^2$ (400 cell/in$^2$), and 0.1 or 0.15 mm (4 or 6 mil) web thickness) and ultra thin wall honeycombs (e.g. 135 cells/cm$^2$ (900 cells/in$^2$), and 0.07 mm (3 mil) web thickness, or 180 cells/cm$^2$ (1200 cells/in$^2$) and 0.048 mm (2 mil) web thickness), where a relatively larger amount of non-solvent is used for extruding a stiffer green body using lower mixing torque.

FIG. 1 is a graph that shows the impact of the TDE on the gel temperature of the A4M METHOCEL. The first curve shown with a line of triangles (Δ) is a water and 5% A4M METHOCEL control showing a gel temperature (the point where the tan δ value crosses 1) at about 57° C. The line of squares (□) is water and 5% A4M METHOCEL with 10 wt % TDE added to the water. The gel temperature of the TDE modified system is 71° C. or about a 14° C. shift in $T_{onset}$ temperature.

The ceramic precursor batch composition disclosed herein may further comprise other additives such as surfactants, oil lubricants and pore-forming material. Non-limiting examples of surfactants that may be used in the practice of the present invention are $C_8$ to $C_{22}$ fatty acids and/or their derivatives. Additional surfactant components that may be used with these fatty acids are $C_8$ to $C_{22}$ fatty esters, $C_8$ to $C_{22}$ fatty alcohols, and combinations of these. Exemplary surfactants are stearic, lauric, myristic, oleic, linoleic, palmitic acids, and their derivatives, stearic acid in combination with ammonium lauryl sulfate, and combinations of all of these. In an illustrative embodiment, the surfactant is lauric acid, stearic acid, oleic acid, and combinations of these. In some embodiments, the amount of surfactants is from about 0.25% by weight to about 2% by weight.

Non-limiting examples of oil lubricants include light mineral oil, corn oil, high molecular weight polybutenes, polyol esters, a blend of light mineral oil and wax emulsion, a blend of paraffin wax in corn oil, and combinations of these. In some embodiments, the amount of oil lubricants is from about 1% by weight to about 10% by weight. In an exemplary embodiment, the oil lubricants is present from about 3% by weight to about 6% by weight.

In filter applications, such as in gasoline or diesel particulate filters, it may be desirable to include a pore forming material in the mixture in an amount effective to subsequently obtain the porosity required for efficient filtering. A pore forming material is any particulate substance (not a binder) that burns out of the green body in the firing step. Although it is to be understood that the invention is not limited to these, in some embodiments the pore forming materials include non-waxy organics that are solid at room temperature, elemental carbon, and combinations of these. Some examples are graphite, starch, cellulose, flour, etc. In one exemplary embodiment, the pore forming material is elemental carbon. In another exemplary embodiment, the pore forming material is graphite. In another exemplary embodiment, the pore forming material is graphite in combination with elemental carbon, starch, cellulose, flour, etc. In some embodiments, graphite has the least adverse effect on the processing. In an extrusion process, for example, the rheology of the mixture may be good when graphite is used. Alternatively, gas or gas producing pore forming materials can also be used. In some embodiments, the pore forming material is up to about 60% by weight as a superaddition. In some embodiments, the amount of graphite is from about 10% to about 30%, and in other embodiments about 15% to about 30% by weight based on the inorganic ceramic-forming ingredients. If a combination of graphite and flour or starch is used, the amount of pore forming material in some embodiments is from about 10% by weight to about 25% by weight with the graphite at 5% by weight to 10% of each and the flour or starch at 5% by weight to about 10% by weight.

Also disclosed herein is a method of producing a ceramic honeycomb body, comprising adding a cellulose-based binder, an aqueous based solvent and a heteroatom polyol agent to inorganic ceramic-forming ingredients. In some embodiments, the heteroatom polyol agent is represented by X(R) where X is at least one of S, N, and P, and R is at least two of $CH_3$, $CH_2CH_2OH$, $CH_2CH_2CH_2OH$, $CH_2(CHOH)CH_3$, $C(CH_2OH)_{1-3}$, $CH_2OH$, $CH(CH_2OH)CHOH$, $C(O)(CHOH)_{1-4}CH_2OH$, and $CH_2CH_2CH_2OCH_3$.

This heteroatom polyol can include, for example, thiodiethanol ($HOCH_2CH_2SCH_2CH_2OH$, 2,2'-thiodiethanol) ("TDE"), represented by formula [1] alone or in combination with other heteroatom polyols.

Formula [1]

The heteroatom polyol can include, for example, 2-[(2-methoxyethyl)sulfanyl]ethanol, represented by formula [2] alone or in combination with other heteroatom polyols.

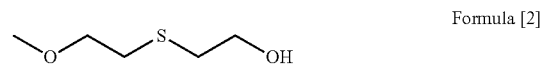

Formula [2]

The heteroatom polyol can include, for example, 3,3'-thiodipropanol ("TDP"), represented by formula [3] alone or in combination with other heteroatom polyols.

$HOCH_2CH_2CH_2SCH_2CH_2CH_2OH$      Formula [3]

The heteroatom polyol can include, for example, tris-(2-hydroxyethyl)-sulfonium chloride, represented by formula [4] alone or in combination with other heteroatom polyols.

Formula [4]

The heteroatom polyol can include, for example, 2,2'-sulfinyldiethanol, represented by formula [5] alone or in combination with other heteroatom polyols.

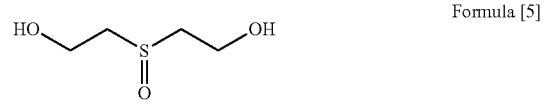

Formula [5]

The heteroatom polyol can include, for example, 2,3,4,5,6-pentahydroxy-N-(2-hydroxyethyl)hexanamide, represented by formula [6] alone or in combination with other heteroatom polyols.

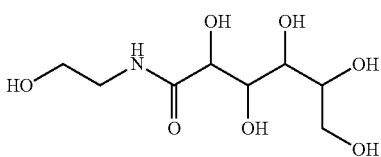

Formula [6]

The heteroatom polyol can include, for example, 1,4-Dideoxy-1,4-imino-D-arabinitol hydrochloride, represented by formula [7] alone or in combination with other heteroatom polyols.

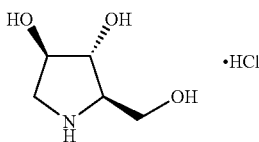

Formula [7]

The heteroatom polyol can include, for example, deoxyfuconojirimycin hydrochloride, represented by formula [8] alone or in combination with other heteroatom polyols.

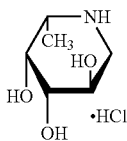

Formula [8]

The heteroatom polyol can include, for example, triethanolamine, represented by formula [9] alone or in combination with other heteroatom polyols.

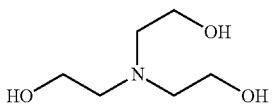

Formula [9]

The heteroatom polyol can include, for example, 2-hydroxy-N,N,N-tris(2-hydroxyethyl)ethanaminium hydroxide, represented by formula [10] alone or in combination with other heteroatom polyols.

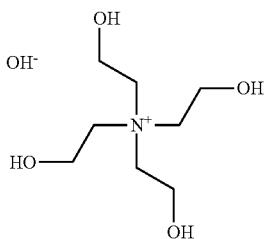

Formula [10]

The heteroatom polyol can include, for example, 1-[N,N-bis(2-hydroxyethyl)amino]-2-propanol, represented by formula [11] alone or in combination with other heteroatom polyols.

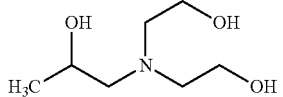

Formula [11]

The heteroatom polyol can include, for example, 2-[bis(2-hydroxyethyl)amino]-2-(hydroxymethyl)-1,3-propanediol, represented by formula [12] alone or in combination with other heteroatom polyols.

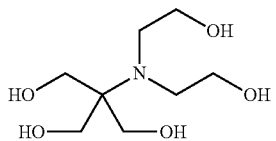

Formula [12]

The heteroatom polyol can include, for example, tetrakis(hydroxymethyl)phosphonium chloride solution, represented by formula [13] alone or in combination with other heteroatom polyols.

Formula [13]

The heteroatom polyol can include, for example, bis[tetrakis(hydroxymethyl)phosphonium]sulfate solution, represented by formula [14] alone or in combination with other heteroatom polyols.

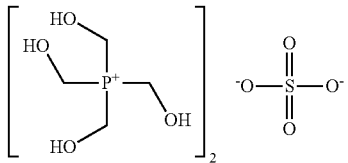

Formula [14]

The heteroatom polyol can also include, for example, combinations of the heteroatom polyols represented by formulas [1]-[14].

In some exemplary embodiments, the heteroatom polyol agent can be added to the batch composition in a concentration of from about 2.5 wt % to about 20 wt %. In an exemplary embodiment, the heteroatom polyol agent can be added to the batch composition in a concentration of from about 8 wt % to about 15 wt %. The concentration of the heteroatom polyol agent is the mass of heteroatom polyol agent to total mass of aqueous solvent.

The inorganic ceramic-forming ingredients, the binder, the solvent and the heteroatom polyol agent are then mixed to form a precursor batch. The inorganic materials, binder, solvent and heteroatom polyol agent may be mixed in a muller or Littleford mixer. The solvent can be added in an amount that is less than is needed to plasticize the batch. With water as the solvent, the water hydrates the binder and the powder particles. The surfactant and/or oil lubricant, if desired, may then be added to the mix to wet out the binder and powder particles.

The precursor batch can then be plasticized by shearing the wet mix formed above in any suitable mixer in which the batch will be plasticized, such as, but not limited to, a twin-screw extruder/mixer, auger mixer, muller mixer, or double arm, etc. Extent of plasticization is dependent on the concentration of the components (binder, solvent, heteroatom polyol agent, surfactant, oil lubricant and the inorganics), temperature of the components, the amount of work put in to the batch, the shear rate, and extrusion velocity. During plasticization, the binder dissolves in the solvent and a gel is formed. The gel that is formed is stiff because the system is very solvent-deficient. The surfactant enables the binder-gel to adhere to the powder particles.

In a further step, the composition may be extruded, such as through an extrusion die or a forming die, to form a green honeycomb body. The presence of the heteroatom polyol agent in the ceramic precursor batch composition may produce a composition with lower viscosity and/or a greater batch stiffening temperature, resulting in an increased rate of extrusion (feedrate) as compared to batch compositions without the heteroatom polyol agent.

It will be appreciated that the bodies produced according to the methods or compositions disclosed herein may have any convenient size and shape and the invention is applicable to all processes in which plastic powder mixtures are shaped. The process may be especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

In some embodiments, honeycomb cell densities can range from about 235 cells/cm$^2$ (1500 cells/in$^2$) to about 15 cells/cm$^2$ (100 cells/in$^2$). Examples of honeycombs produced by the process disclosed herein, although it is to be understood that the claimed invention is not limited to such, include those having about 94 cells/cm$^2$ (about 600 cells/in$^2$), or about 62 cells/cm$^2$ (about 400 cells/in$^2$) each having wall thicknesses of about 0.1 mm (4 mils). In some embodiments, wall thicknesses can be from about 0.07 to about 0.6 mm (about 3 to about 25 mils), and in some embodiments of about 0.02-0.048 mm (1-2 mils). The method may be especially suited for extruding thin wall/high cell density honeycombs.

The extrudates can then be dried and fired according to known techniques. The addition of the heteroatom polyol agent may allow less water to be used, aiding in the drying and firing of the green body. The firing conditions of temperature and time may depend on the composition and size and geometry of the body, and the invention is not limited to specific firing temperatures and times. For example, in compositions which are primarily for forming cordierite, the temperatures in some embodiments are from about 1300° C. to about 1450° C., and the holding times at these temperatures can be in some embodiments from about 1 hour to about 6 hours. For mixtures that are primarily for forming mullite, the temperatures can be in some embodiments from about 1400° C. to about 1600° C., and the holding times at these temperatures can be in some embodiments from about 1 hour to about 6 hours. For cordierite-mullite forming mixtures which yield the previously described cordierite-mullite compositions, the temperatures can be in some embodiments from about 1375° C. to about 1425° C. Firing times depend on factors such as kinds and amounts of materials and nature of equipment but in some embodiments total firing times may be from about 20 hours to about 80 hours. For metal bodies, the temperatures may be about 1000° C. to 1400° C. in a reducing atmosphere such as hydrogen. Firing times depend on factors as discussed above but may in some embodiments be at least 2 hours and typically about 4 hours. For zeolite bodies, the temperatures may be about 400° C. to 1000° C. in air. Firing times depend on factors as discussed above but may in some embodiments be about 4 hours.

EXAMPLES

The invention will be further clarified by the following examples.

Example 1—Cordierite

A number of sample batches were made to demonstrate how TDE can increase the batch stiffening temperature of a cordierite ceramic paste composition. TDE was added to the cordierite ceramic paste composition at concentrations of 2.5 wt %, 5 wt % and 10 wt % of the 22% water call based on inorganics. The TDE was added to the water to dissolve prior to injecting onto the solid material components. The solid dry components were mixed in the standard procedure using a Process-All plow blade mixer. The liquids (water with TDE, Durasyn oil, tall oil) were spray injected into the dry batch and then all components were mixed for several minutes to homogeneously disperse the batch. Both the control (no TDE) and batch with TDE contained a water level of 22% and F240 METHOCEL (DOW CHEMICAL) level of 5.4% superaddition based on inorganics. The TDE concentration at this water level equated to 2.5 wt %, 5 wt % and 10 wt % (mass TDE/total mass water). After blending all the solid and liquid materials, 360 g of the damp powder batch was plasticized in a Brabender® mixer at 50 rpm for 10 minutes. The paste was removed from the Brabender® and loaded into a ram where the barrel was sealed under vacuum to remove air and then spaghetti extruded two times. After the spaghetti and de-airing steps, the batch was extruded into rods 1 ft long and 0.5 inches in diameter so that they could be directly loaded into a capillary rheometer for temperature sweep tests for measuring the stiffening temperature of the paste.

Figure 2:
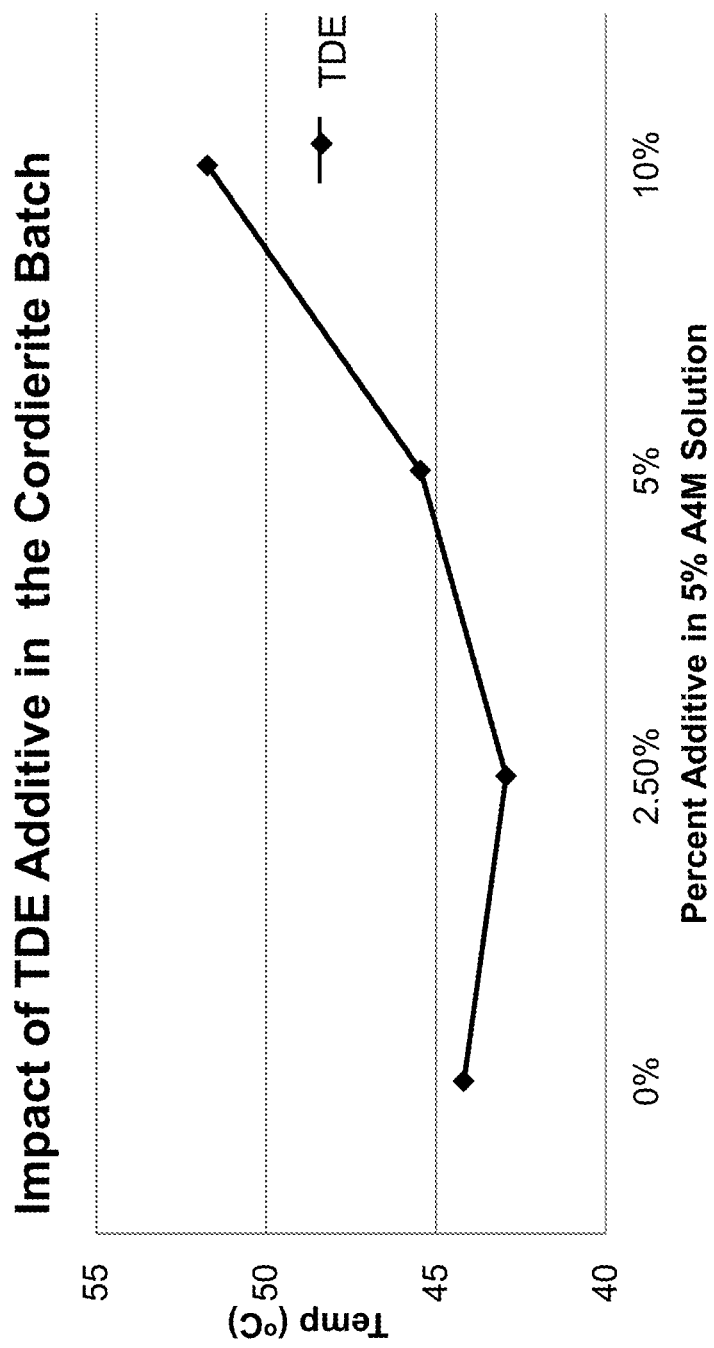
FIG. 2 is a graphical representation of the impact on $T_{onset}$ of thiodiethanol ($HOCH_2CH_2SCH_2CH_2OH$, 2,2'-thiodiethanol) ("TDE") additive in cordierite batch according to an exemplary embodiment of the disclosure.

The batch stiffening temperature ($T_{onset}$) of the control (no TDE) and composition with concentrations of 2.5 wt %, 5 wt % and 10 wt % of TDE was measured using a dual barrel temperature sweep method. $T_{onset}$ is defined as the temperature at which the capillary pressure increases by 15% above the stable baseline pressure during extrusion through a zero length capillary die. At this temperature the binder begins to undergo its thermal phase transition and the pressure begins to increase sharply. FIG. 2 shows the impact on $T_{onset}$ of TDE additive in the cordierite batch at concentrations of 2.5 wt %, 5 wt % and 10 wt % of the 22% water call based on inorganics.

Table 1 shows the results of lab extrusion experiments using the cordierite batch material. For the examples shown in Table 1, all the solid and liquid materials were blended and 360 g of the damp powder batch was plasticized in a Brabender® mixer at 50 rpm for 10 minutes. The paste was removed from the Brabender® and loaded into a ram where the barrel was sealed under vacuum to remove air and then spaghetti extruded two times. After the spaghetti and de-airing steps, the batch was extruded into rods 1 ft long and 0.5 inches in diameter so that they could be directly loaded into a capillary rheometer for temperature sweep tests for measuring the stiffening temperature of the paste. In Table 1, the cordierite control is a standard batch material with a 22% water call. The example 1 is the cordierite batch material with a 22% water call except the water is a 10% solution of TDE. Both of these samples were run through the Brabender® and capillary rheometer using a temperature sweep as described above. The $T_{onset}$ values show that there is about a 7° C. increase of $T_{onset}$ in the batch containing the TDE molecule. This data is also consistent with the trend predicted by the capillary data in FIG. 2 and with the results from the aluminum titanate (AT) batch material below.

TABLE 1

| | $T_{onset}$ (° C.) |
|---|---|
| Example 1 | 51.72 |
| Cordierite Control | 44.18 |

Example 2—Aluminum Titanate

A sample batch was made to demonstrate how 2,2'-Thiodiethanol ("TDE") can increase the batch stiffening temperature of an aluminum titanate (AT) based ceramic paste composition. TDE was added to the AT batch at a concentration of 10 wt % of the total water call of 22 wt % of inorganics plus pore former. The TDE was added to the water to dissolve first. The other solid dry components were mixed with a standard procedure using a Process-All plow blade mixer. The liquids (water with dissolved heteroatom polyol and tall oil) were spray injected into the dry batch and then all components were mixed for several minutes to homogeneously disperse the batch. Both the control (no TDE) and batch with TDE contained a water level of 22% and F-type hydroxypropyl methylcellulose (BD06A Metolose from Shin Etsu) level of 2.2% based on inorganics plus poreformer. The TDE concentrations at this water level equated to 10% (mass TDE/total mass water).

After blending all the solid and liquid materials, 360 g of the damp powder batch was plasticized in a Brabender® mixer at 50 rpm for 10 minutes. The paste was removed from the Brabender® and loaded into a ram where the barrel was sealed under vacuum to remove air and then spaghetti extruded two times. After the spaghetti and de-airing steps, the batch was extruded into rods 1 ft long and 0.5 inches in diameter so that they could be directly loaded into a capillary rheometer for temperature sweep tests for measuring the stiffening temperature of the paste.

The batch stiffening temperature ($T_{onset}$) of the control (no TDE) and composition with TDE was measured using a dual barrel temperature sweep method. $T_{onset}$ is defined as the temperature at which the capillary pressure increases by 15% above the stable baseline pressure during extrusion through a zero length capillary die. At this temperature the binder begins to undergo its thermal phase transition and the pressure begins to increase sharply. Table 2 shows the results of lab extrusion experiments using the AT batch material. The AT control is a standard batch material with a 22% water call. The example 2 is the AT batch material with a 22% water call except the water is a 10% solution of TDE. Both of these samples were run through the Brabender® and capillary using a temperature sweep as described above. The $T_{onset}$ values show that there is about an 8° C. increase of $T_{onset}$ in the batch containing the TDE molecule. This data is consistent with the results from the cordierite material above.

TABLE 2

| | $T_{onset}$ (° C.) |
|---|---|
| Example 2 | 52.97 |
| AT Control | 44.51 |

Figure 3:
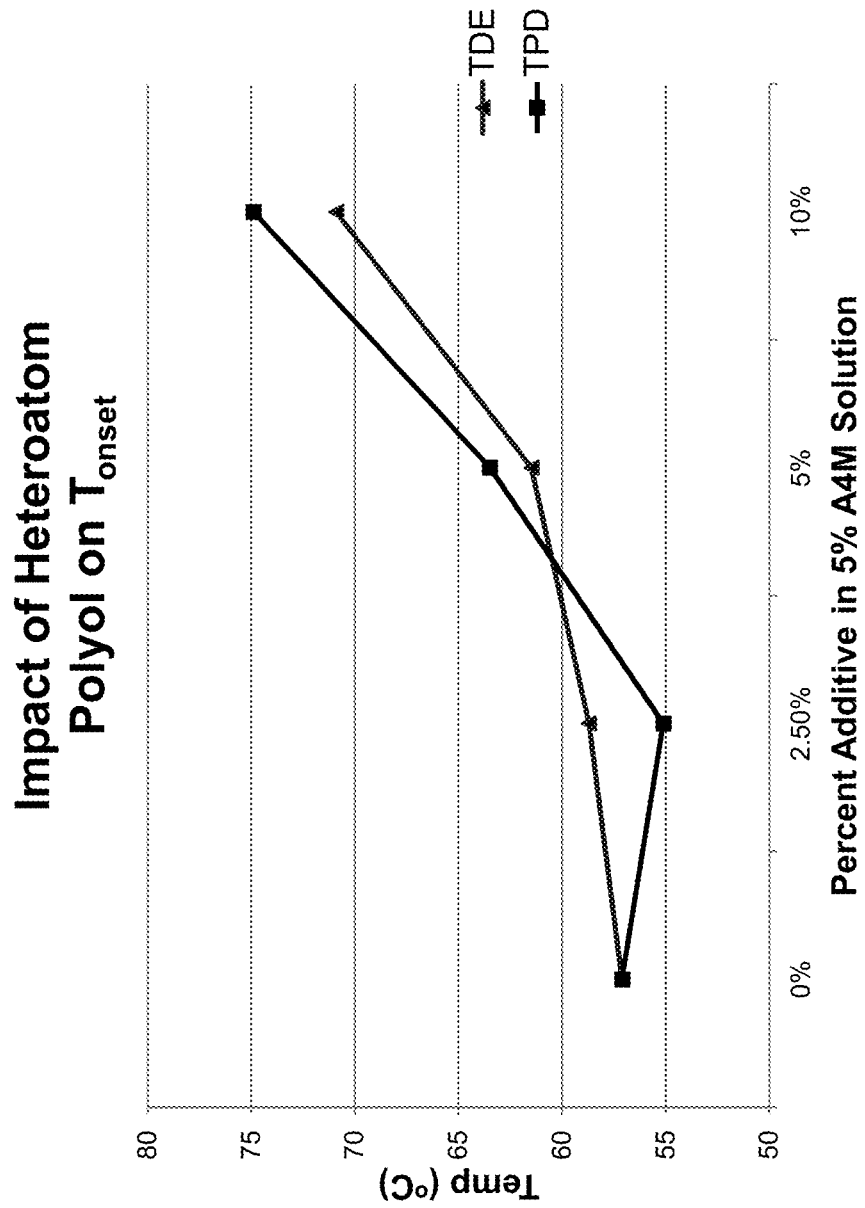
FIG. 3 is a graphical representation of the impact on $T_{onset}$ of thiodipropanol ($HOCH_2CH_2CH_2SCH_2CH_2CH_2OH$, 3,3'-thiodipropanol) ("TDP") and thiodiethanol ($HOCH_2CH_2SCH_2CH_2OH$, 2,2'-thiodiethanol) ("TDE") additive when mixed with water and A4M METHOCEL according to an exemplary embodiment of the disclosure.

FIG. 3 shows the impact on $T_{onset}$ of thiodipropanol ($HOCH_2CH_2CH_2SCH_2CH_2CH_2OH$, 3,3'-thiodipropanol) ("TDP") additive in water with A4M METHOCEL according to an exemplary embodiment. In FIG. 3 the TDP additive as a percent of A4M METHOCEL (DOW CHEMICAL) level of 5% superaddition is shown. The TDP concentration at this water level equated to 2.5 wt %, 5 wt % and 10 wt % (mass TDP/total mass water). As can be seen from the graph of FIG. 3, TDP provides a greater benefit than TDE to raising $T_{onset}$.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A ceramic precursor batch composition, comprising:
   inorganic ceramic-forming ingredients;
   a cellulose-based binder;
   an aqueous-based solvent; and
   a heteroatom polyol agent, wherein the heteroatom polyol agent is represented by X(R) where X is at least one of S and P, and R is at least two of $CH_2CH_2OH$, $CH_2CH_2CH_2OH$, $CH_2(CHOH)CH_3$, $C(CH_2OH)_{1-3}$, $CH_2OH$, $CH(CH_2OH)CHOH$, and $C(O)(CHOH)_{1-4}$ $CH_2OH$, or at least one of $C(CH_2OH)_{2-3}$, $CH(CH_2OH)$ $CHOH$, and $C(O)(CHOH)_{1-4}CH_2OH$ combined with at least one of $CH_3$ and $CH_2CH_2CH_2OCH_3$.

2. The ceramic precursor batch composition of claim 1, wherein the heteroatom polyol agent comprises thiodiethanol ("TDE"), 2-[(2-methoxyethyl)sulfanyl]ethanol, 3,3'-thiodipropanol ("TDP"), tris-(2-hydroxyethyl)-sulfonium chloride, 2,2'-sulfinyldiethanol, tetrakis(hydroxymethyl) phosphonium chloride solution, bis[tetrakis(hydroxymethyl)phosphonium] sulfate solution, or combinations thereof.

3. The ceramic precursor batch composition of claim 1, wherein the heteroatom polyol agent comprises thiodiethanol, thiodipropanol, or combinations thereof.

4. The ceramic precursor batch composition of claim 1, further comprising up to 60 weight % of a pore forming material wherein the weight % is based on 100% of the inorganic ceramic-forming ingredients.

5. The ceramic precursor batch composition of claim 4, wherein the pore forming material is at least one of starch and graphite.

6. The ceramic precursor batch composition of claim 1, further comprising a pore forming material, wherein the pore forming material is at least one of starch and graphite.

7. The ceramic precursor batch composition of claim 1, wherein the precursor batch composition comprises the heteroatom polyol agent in a concentration of from about 2.5 wt % aqueous solution to about 20 wt % aqueous solution.

8. The ceramic precursor batch composition of claim 7, wherein the precursor batch composition comprises the heteroatom polyol agent in a concentration of from about 8 wt % aqueous solution to about 15 wt % aqueous solution.

9. The ceramic precursor batch composition of claim 1, wherein the inorganic ceramic-forming material comprises cordierite or aluminum titanate-forming ingredients.

10. The ceramic precursor batch composition of claim 1, wherein the cellulose-based binder comprises methylcellulose, ethylhydroxy ethylcellulose, hydroxybutyl methylcellulose, hydroxymethylcellulose, hydroxypropyl methylcellulose, hydroxylethyl methylcellulose, hydroxybutyl methylcellulose, hydroxyethylcellulose, hydroxypropylcellulose, sodium carboxy methylcellulose or combinations thereof.

* * * * *